(12) United States Patent
Brady, Jr.

(10) Patent No.: US 6,790,251 B1
(45) Date of Patent: Sep. 14, 2004

(54) SKULL-SHAPED AIR FILTER HOUSING

(76) Inventor: Stephen H. Brady, Jr., 4601 E. Hwy. 100 St., C2, Bunnell, FL (US) 32110

( * ) Notice: Subject to any disclaimer, the term of this patent is extended or adjusted under 35 U.S.C. 154(b) by 85 days.

(21) Appl. No.: 10/354,311

(22) Filed: Jan. 30, 2003

(51) Int. Cl.$^7$ .......................... B01D 35/30; B01D 46/00
(52) U.S. Cl. .......................... 55/419; 55/385.3; 55/503; 55/505; 55/DIG. 28; 96/397; 123/198 E
(58) Field of Search ................................ 55/385.3, 418, 55/419, 495, 503, 505, 529, DIG. 28; 96/397, 400, 415; 123/198 E

(56) References Cited

U.S. PATENT DOCUMENTS

| | | | |
|---|---|---|---|
| 4,321,978 A | * 3/1982 | Tominaga et al. | 55/385.3 |
| 4,354,570 A | * 10/1982 | Tanaka et al. | 55/385.3 |
| 4,648,474 A | 3/1987 | Shinozaki et al. | |
| 5,307,771 A | 5/1994 | Stahel, II et al. | |
| 5,343,831 A | 9/1994 | Collins | |
| 5,367,988 A | 11/1994 | Collins | |
| 5,865,863 A | * 2/1999 | DeSousa et al. | 55/385.3 |
| 5,868,808 A | 2/1999 | Henderson | |
| 5,918,576 A | 7/1999 | Ohoka et al. | |
| 6,162,269 A | 12/2000 | Greenlees et al. | |
| 6,251,151 B1 | * 6/2001 | Kobayashi et al. | 55/DIG. 28 |
| 6,287,354 B1 | * 9/2001 | Nozaki | 55/385.3 |
| 6,325,169 B1 | * 12/2001 | Tateshima et al. | 55/385.3 |
| 6,374,815 B1 | * 4/2002 | Ness et al. | 123/198 E |
| 6,401,672 B2 | 6/2002 | Raffenberg et al. | |
| 6,726,742 B2 | * 4/2004 | Arden et al. | 55/419 |
| 6,736,871 B1 | * 5/2004 | Green et al. | 55/385.3 |
| 2002/0189214 A1 | * 12/2002 | Hettmann et al. | 55/385.3 |

OTHER PUBLICATIONS

Zambini Custom Motorcycle Parts. Catalogue [online]. Instantop, Inc. [retrieved on Jun. 14, 2004]. Retrieved from the Internet: <URL: http://www.instantop.com/CyclePage/Zambini.htm>.*

* cited by examiner

Primary Examiner—Duane Smith
Assistant Examiner—Jason M. Greene
(74) Attorney, Agent, or Firm—Paul S. Rooy

(57) ABSTRACT

A skull-shaped air filter housing comprising a housing removably attached to a fitting. A jaw is hingedly attached along a lower edge of a face on the housing. The face has eye intake(s), a nose intake, and a jaw intake. When the jaw is open, air enters a housing cavity through the jaw intake. Means of rotating the jaw are disclosed, including cable actuation, spring biasing, and pneumatic actuators. The housing may contain a light for aesthetic purposes. The fitting may incorporate a fitting lumen diameter reduction at its intake to cool and compress air sent to the carburetor. When ram air enters the skull-shaped air filter housing and is sent to the carburetor, it is compressed and therefore denser, and fuel in the carburetor bowl is also compressed, resulting in a power increase in the engine.

29 Claims, 6 Drawing Sheets

SKULL-SHAPED AIR FILTER HOUSING

BACKGROUND OF THE INVENTION

1. Field of the Invention

This invention relates to air filters for engines, and in particular to a skull-shaped air filter housing.

2. Background of the Invention

Air filters serve an important function in internal combustion engines, in that they help prevent entry of dust and other particulate matter into the sensitive carburetion systems of these engines. Even a small amount of dirt or dust can foul and plug the small jets in carburetors, causing their malfunction and even failure.

Motorcycles typically have an air filter mounted on the side of the motorcycle. The air filter in these installations is often connected to the motorcycle carburetor by means of a 90 degree fitting, which allows the longitudinal axis of the air filter to align with the airflow.

One problem with current motorcycle air filter installations is the lack of a housing to capture ram air and pressurize the air filter. The advantage to pressurizing the air into the carburetor is denser air, as well as slightly pressurized fuel due to ram air pressure on the carburetor bowl, which translates into higher horsepower output from the engine. The engine thinks it's at a lower density altitude than it actually is, and performs better. This happens because the air is denser, so there are more molecules of oxygen per cubic foot for the engine to burn.

Thus, it would be desirable to provide an air filter housing which captures ram air pressure when the motorcycle is at speed, and uses the ram air pressure to pressurize the air and fuel going into the carburetor in order to extract greater power from the engine.

Another problem with currently available motorcycle air filter installations is the lack of aesthetic appeal of a raw air filter mounted to the side of the motorcycle. Thus, it would be desirable to provide an air filter housing which is aesthetically pleasing.

SUMMARY OF THE INVENTION

Accordingly, it is an object of the present invention to provide a skull-shaped air filter housing which captures ram air pressure when the motorcycle is at speed, and uses the ram air pressure to pressurize the air and fuel going into the carburetor in order to extract greater power from the engine. Design features allowing this object to be accomplished include a housing having eye intakes, a nose intake, and a jaw intake. Advantages associated with the accomplishment of this object include greater power extracted from the engine, and the speed, performance and safety advantages associated therewith.

It is another object of the present invention to provide a skull-shaped air filter housing which is aesthetically pleasing. Design features allowing this object to be accomplished include a housing shaped like a skull, head, or face, be it human, hog, dragon, wolf, tiger, lion, or other type of skull. A benefit associated with the accomplishment of this object is a nicer looking air filter installation.

It is still another object of this invention to provide a skull-shaped air filter housing which incorporates a variable sized opening. Design features enabling the accomplishment of this object include a jaw intake covered by a jaw sized and located to cover the jaw intake when the jaw is in a closed position. Advantages associated the realization of this object include the provision of a greater quantity of ram air to the engine when the motorcycle is a speed, and the speed, performance and safety advantages associated therewith.

It is yet another object of this invention to provide a skull-shaped air filter housing which is inexpensive to produce. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIG. 1. Sheet two contains FIG. 2. Sheet three contains FIGS. 3 and 4. Sheet four contains FIG. 5. Sheet five contains FIG. 6. Sheet six contains FIGS. 7 and 8.

DETAILED DESCRIPTION OF THE PREFERRED EMBODIMENT

Figure 1:
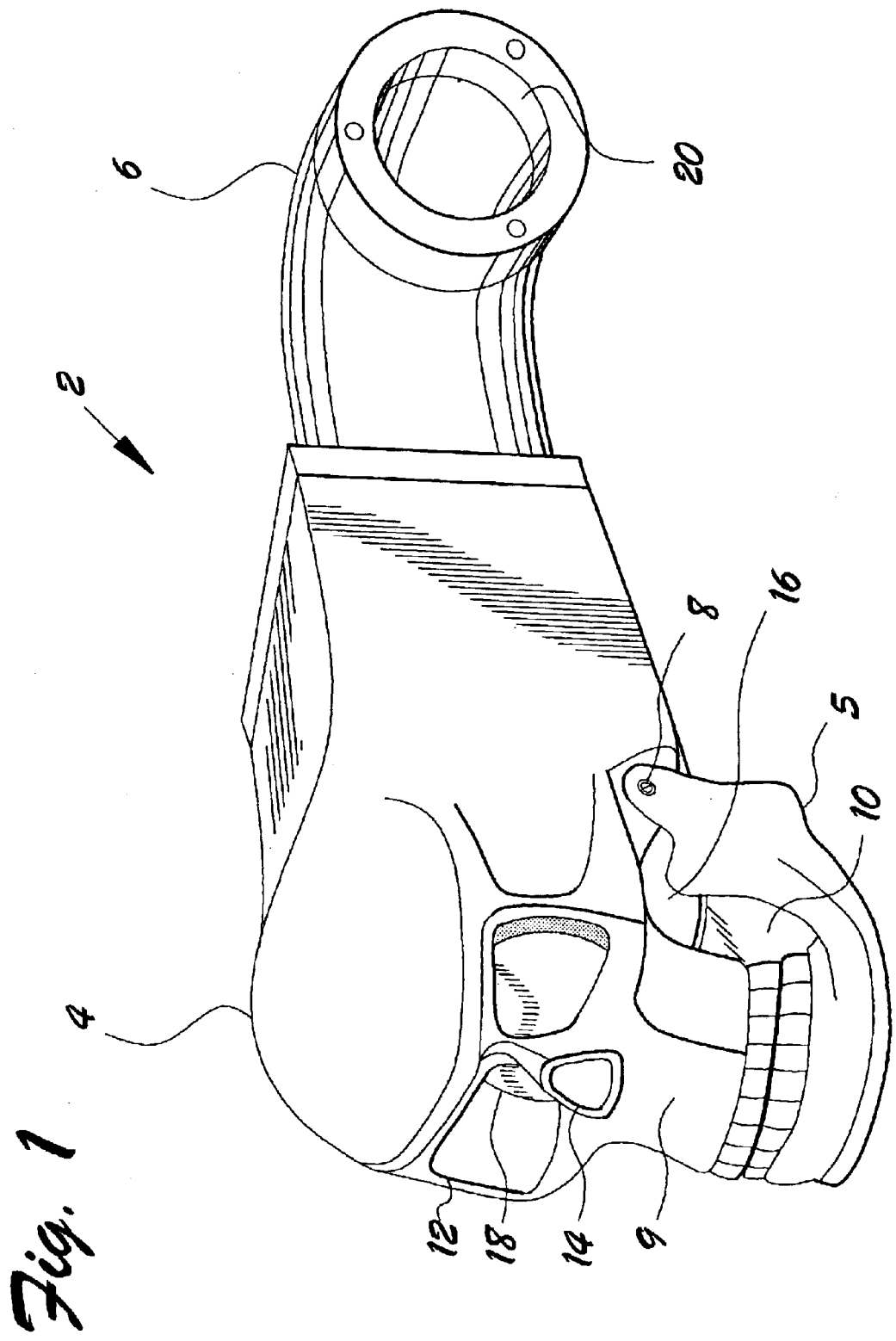
FIG. 1 is a front quarter isometric view of a skull-shaped air filter housing.
Figure 2:
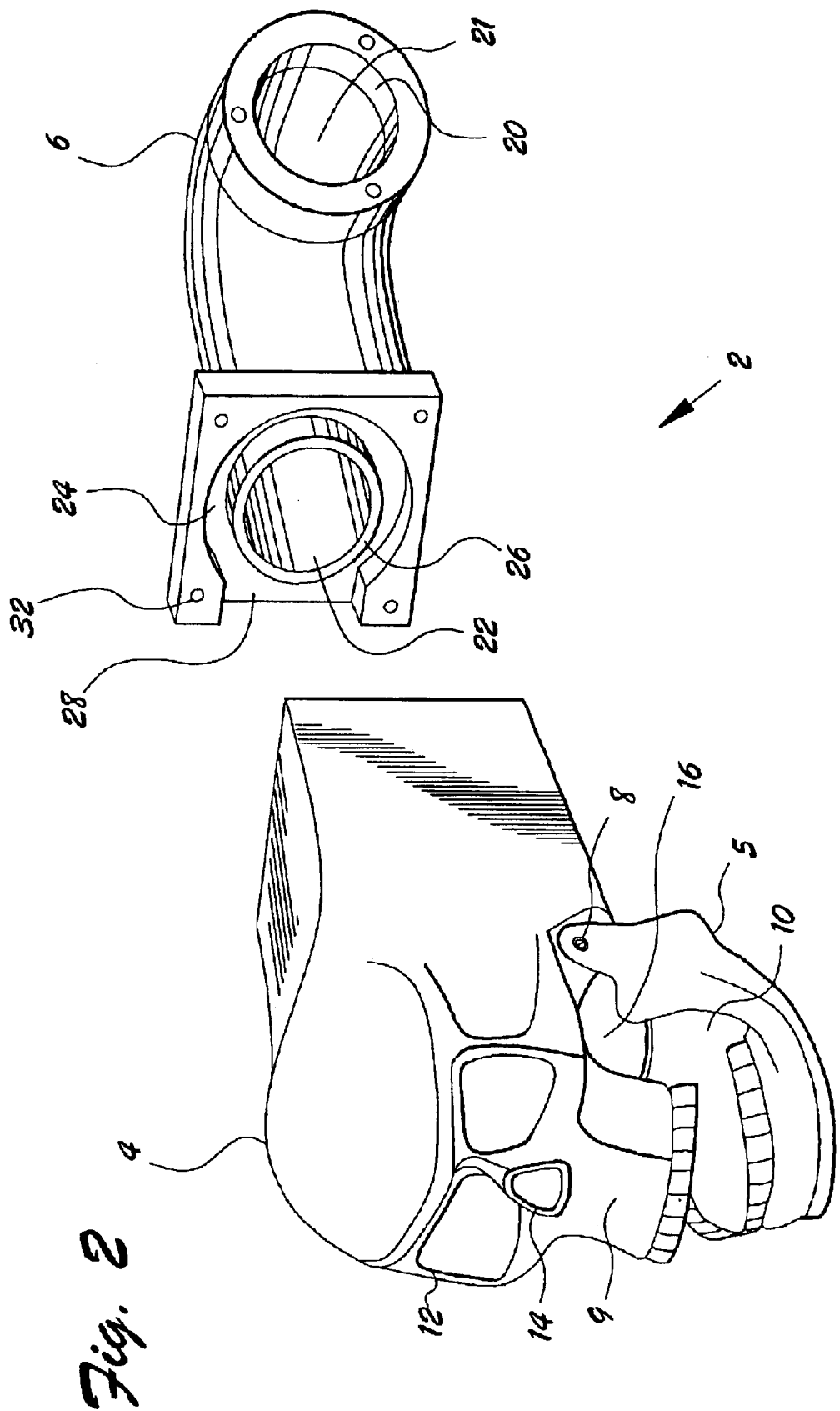
FIG. 2 is a front quarter exploded isometric view of a skull-shaped air filter housing.

FIG. 1 is a front quarter isometric view of skull-shaped air filter housing 2 with jaw 5 in the closed position. FIG. 2 is a front quarter exploded isometric view of skull-shaped air filter housing 2 with jaw 5 in the open position. Skull-shaped air filter housing 2 comprises housing 4 removably attached to fitting 6. Housing 4 is shaped like a skull, and comprises housing face 9 at its front end, and housing filter aperture 11 at its rear end. Housing cavity 7 sized to accommodate air filter 18 is disposed within housing 4.

Eye intakes 12, nose intake 14, and jaw intake 16 are disposed in face 9. Housing cavity 7 communicates with an exterior of housing cavity 7 through eye intakes 12, nose intake 14, and jaw intake 16 disposed in face 9 at the front of housing 4, and housing filter aperture 11 at the rear of housing 4.

Jaw 5 is hingedly attached to a lower edge of face 9 by means of jaw hinges 8. When jaw 5 is in the open position as depicted in FIG. 2, ram air is free to flow through jaw intake 16 into housing cavity 7. When jaw 5 is in the closed position as depicted in FIG. 1, ram air is impeded by jaw 5 from flowing into housing cavity 7 through jaw intake 16, but rather flows in via eye intake(s) 12 and nose intake 14.

Figure 3:
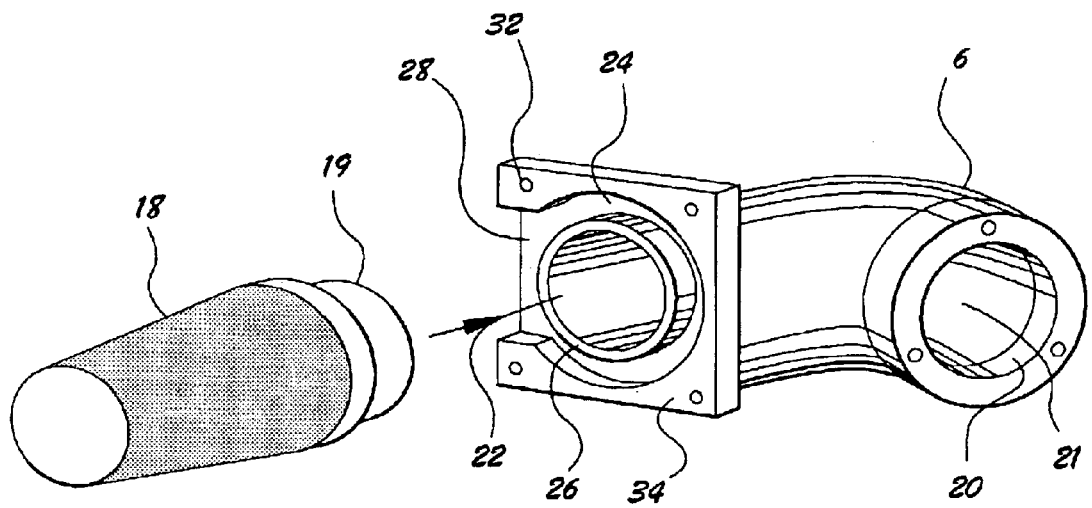
FIG. 3 is a left side quarter isometric view of an air filter about to be connected to a fitting.
Figure 4:
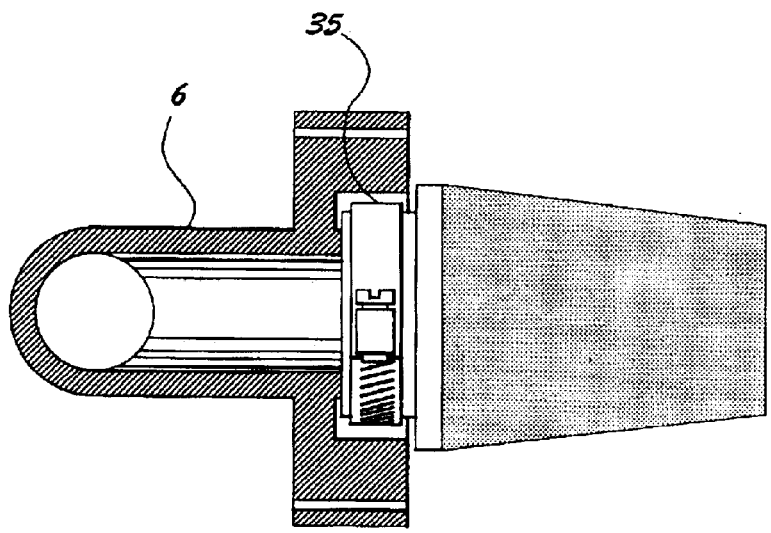
FIG. 4 is a right side cross-sectional view of an air filter attached to a fitting.

FIG. 3 is a left side quarter isometric view of air filter 18 about to be connected to fitting 6. FIG. 4 is a right side cross-sectional view of air filter 18 attached to fitting 6. Fitting 6 comprises fitting lumen 21 which communicates with the exterior of fitting 6 at one end through fitting intake 22, and at an opposite end through fitting outlet 20. Fitting intake flange 34 is disposed at the end of fitting 6 at which fitting intake 22 is disposed. Fitting intake flange 34 comprises at least one fitting intake fastener bore 32 through which a fastener removably attaches to housing 4. In addition, fitting intake flange 34 comprises filter groove 24 sized to admit air filter mouth 19. Filter nipple 26 is disposed within filter groove 24, and is sized to fit into air filter mouth 19.

Air filter 18 is removably attached to fitting 6 as depicted in FIGS. 3 and 4. First, housing 4 is detached from fitting 6 by removing fasteners through fitting intake fastener bore(s) 32. Then hose clamp 35 is placed loosely around air filter mouth 19, and filter nipple 26 is pressed into air filter mouth 19 as indicated by arrow 30 in FIG. 3. Then hose clamp 35 is tightened around air filter mouth 19. If necessary, access may be gained to tighten or loosen hose clamp 35 through hose clamp access notch 28 in fitting intake flange 34.

Figure 5:
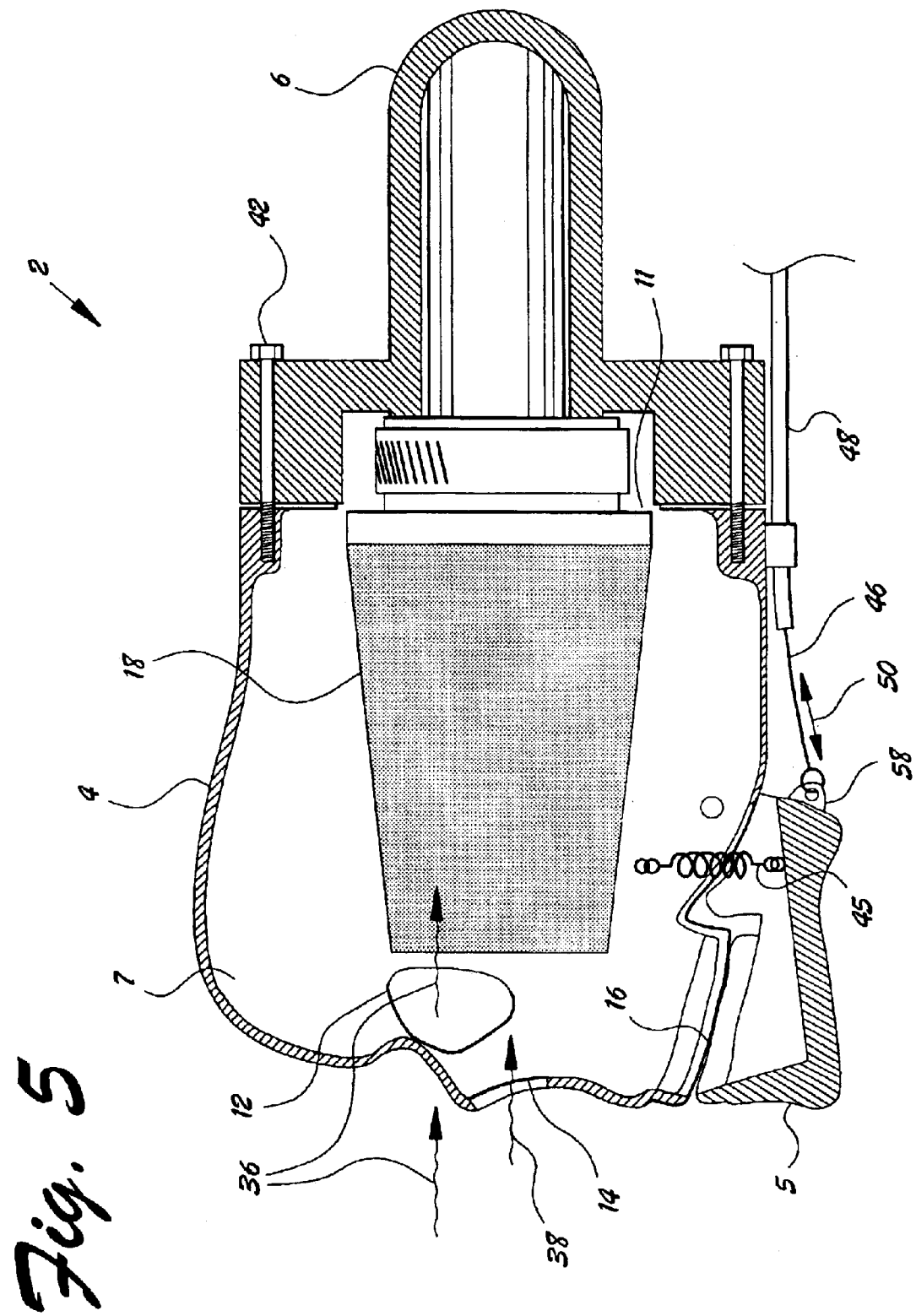
FIG. 5 is left side cross-sectional view of a skull-shaped air filter housing with its jaw in the closed position.
Figure 7:
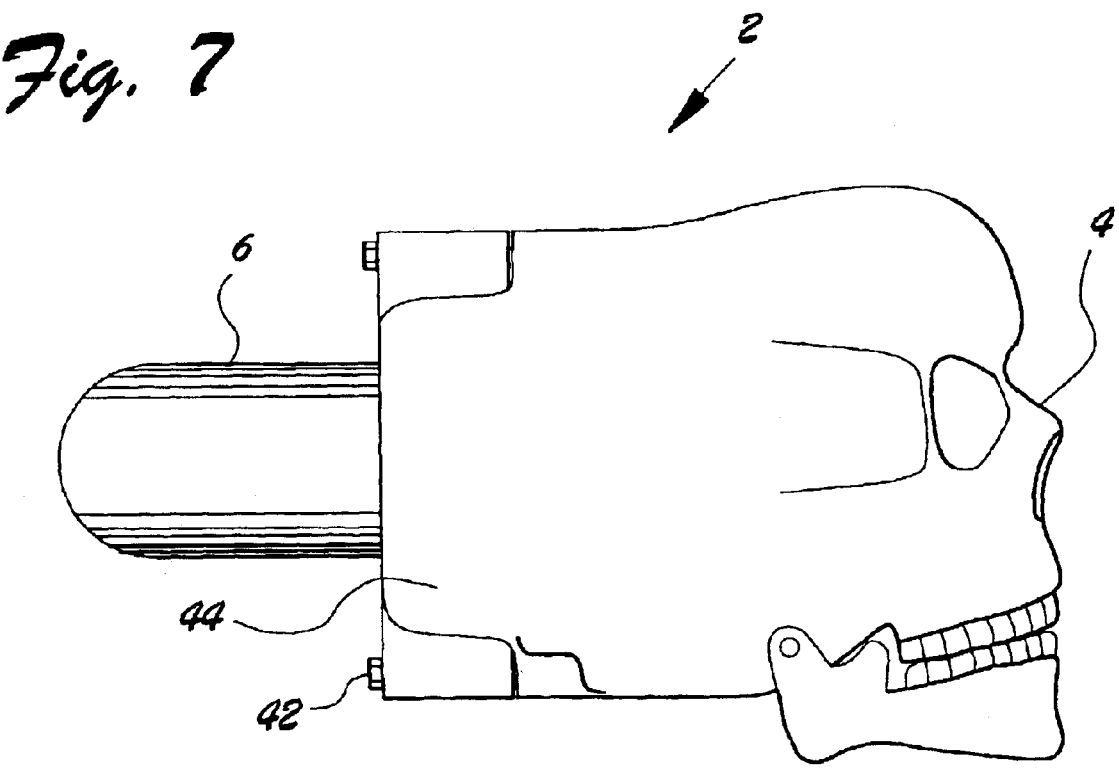
FIG. 7 is a rights side view of a skull-shaped air filter housing.

Housing 4 is then re-attached to fitting 6 using fastener(s) 42 through fitting intake fastener bore(s) 32 as depicted in FIG. 5. As may be observed in FIG. 7, housing 4 further comprises hose clamp access notch cover 44 sized and located to cover and seal hose clamp access notch 28 when housing 4 is attached to fitting 6.

In the preferred embodiment, fitting 6 comprised a bend of substantially 90 degrees, in order to permit fitting outlet 20 to be mounted to a side-ways facing motorcycle carburetor air intake, and still provide for face 9 to face forward into the relative wind impinging upon the motorcycle when in motion. It is contemplated to fall within the scope if this invention that fitting 6 may incorporate a substantially 90 degree angle, such as in the fitting 6 depicted in FIGS. 1–8, or any other angle, or may be straight, as would be used with some turbo-charged engines.

Various means are disclosed to actuate jaw 5. One reason that it is desirable to provide for actuation of jaw 5 is to provide additional ram air to the motorcycle carburetor as the motorcycle speed increases. Another reason is for aesthetic purposes—it would be desirable to have jaw 5 open automatically as if skull housing 4 was talking when the motorcycle operator revs his engine while stopped at traffic lights, to impress other bikers and passing young ladies, for example.

Figure 6:
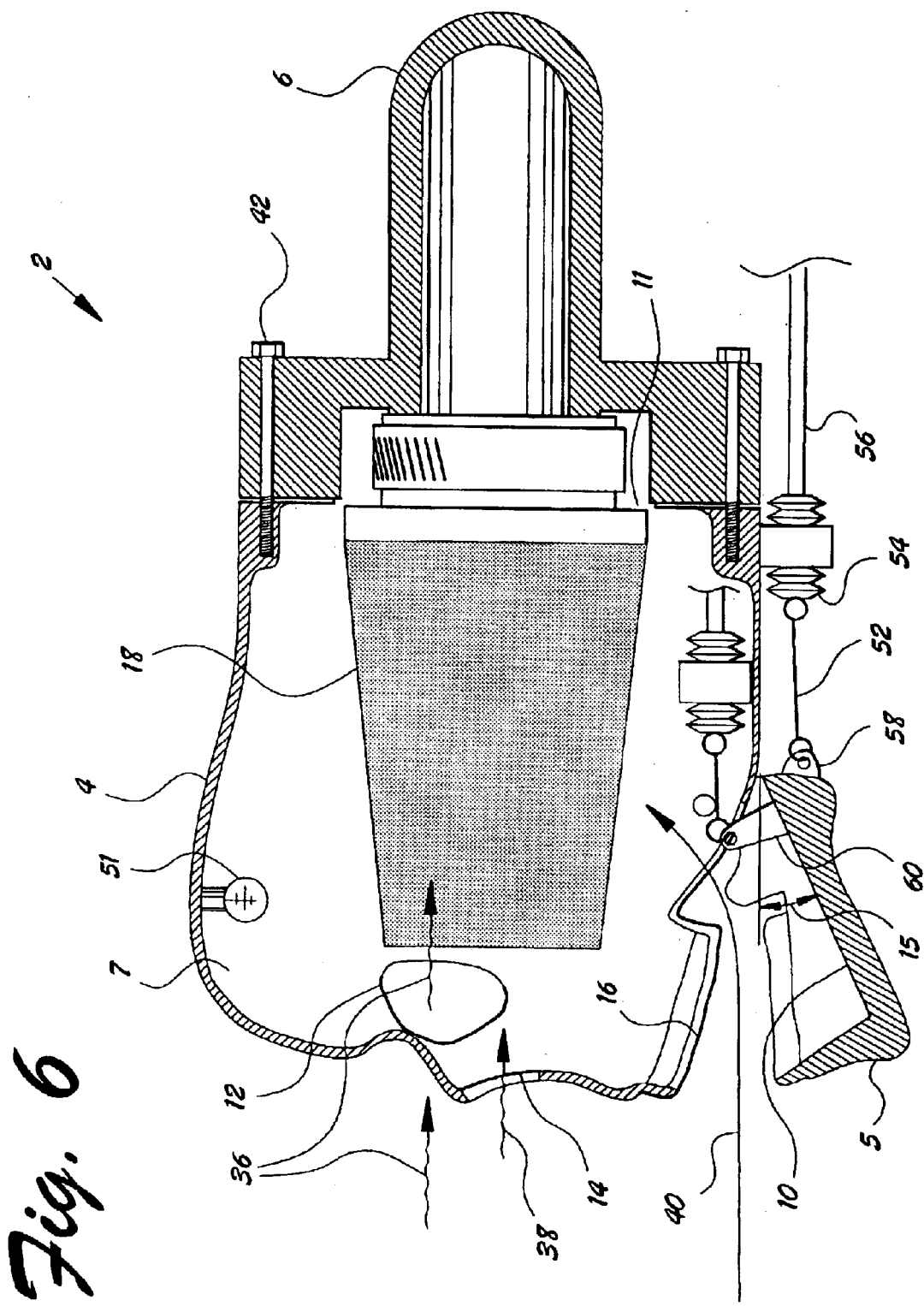
FIG. 6 is left side cross-sectional view of a skull-shaped air filter housing with its jaw in the open position.

As a motorcycle upon which the instant skull-shaped air filter housing 2 is mounted increases speed, so also does its engine, and the need for air also increases. As the speed of the motorcycle increases, so also does the ram air impinging on jaw 5. This ram air may be used to open jaw 5 to uncover jaw intake 16 at a pre-determined speed, such as twenty miles per hour. The operator may wish to manually control the position of jaw 5, and one embodiment providing this capability is illustrated in FIG. 5. Still another embodiment provides that vacuum pressure from the engine automatically opens and closes jaw 5. For example, FIG. 6 illustrates one embodiment wherein jaw 5 remains closed when the motorcycle engine is not running or is idling, and when the motorcycle operator revs the engine, jaw 5 opens automatically in response to the changing vacuum. In this embodiment, jaw 5 would open at a pre-determined manifold pressure, such as that corresponding to the motorcycle increasing its speed above twenty miles per hour.

Thus, while several jaw actuation embodiments are disclosed herein, it is contemplated to fall within the scope of this invention that any method of actuation of jaw 5 may be used. FIGS. 5 and 6 illustrate a number of these.

FIG. 5 is a left side cross-sectional view of skull-shaped air filter housing 2 with its jaw 5 held in the closed position by means of spring 45. The rotational position of jaw 5 is controlled by cable 46, which reciprocates within cable sheath 48 as indicated by arrow 50. An opposite extreme of cable 46 may be mounted to a convenient location on the motorcycle, such as on its side or on its handlebars. The rotational position of jaw 5 may then be manually controlled by the motorcycle operator by extending or retracting cable 46 as desired. In the preferred embodiment, cable 46 and cable sheath 48 were bicycle or motorcycle brake or gear changing cables, and terminated in a handlebar mounted lever such as a bicycle gear change lever.

FIG. 5 additionally depicts the possibility of the rotational position of jaw 5 being determined solely be spring 45 in combination with ram air, the aid of without cable 46 and cable sheath 48. Where only spring 45 is installed, spring 45 is installed under sufficient tension to hold jaw 5 in the closed position against the weight of jaw 5, when the motorcycle is not in motion. When the motorcycle accelerates to approximately 20 miles per hour, ram air impinging against jaw 5 in combination with the weight of jaw 5 overcome the installed tension of spring 45, and open jaw 5.

Increasing ram air pressure as the motorcycle continues to accelerate serves to increase the density of air into the carburetor, and also pressurizes fuel in the carburetor bowl, in order to increase the power available from the engine. Thus, when the motorcycle upon which the instant skull-shaped air filter housing 2 is mounted is idling or travelling slowly, jaw 5 covers jaw intake 16, and air enters housing cavity 7 solely through eye intake(s) 12 and nose intake 14, as indicated by arrows 36 and 38 respectively. As the motorcycle upon which the instant skull-shaped air filter housing 2 is mounted accelerates and more ram air is required, jaw 5 rotates into the open position, uncovering jaw intake 16, and additional ram air enters housing cavity 7 as illustrated by arrow 40.

It is important to note that FIG. 5 illustrates two separate, independent means of controlling the position of jaw 5: spring 45 in isolation, and cable 46 with cable sheath 48 in isolation. Of course, if desired, the two may be used in conjunction.

FIG. 6 depicts two additional means of controlling the angular position of jaw 5, by means of interior jaw bellcrank 60 and exterior jaw bellcrank 58. Pushrod 52 is attached to the output of a pneumatically actuated device such as one end of bellows 54, and engine vacuum source 56 is connected to an opposite end of bellows 54. The engine vacuum source be any appropriate engine vacuum source, such as a carburetor vacuum chamber. The end of pushrod 52 opposite bellows 54 is connected to exterior jaw bellcrank 58 in one embodiment, and to interior jaw bellcrank 60 in another embodiment. Thus, depending on which bellcrank pushrod 52 is connected to, changes in the vacuum pressure will either open or close jaw 5. In the preferred embodiment, jaw 5 was closed when the engine was not running and when the engine was running at idle, and opened when the speed of the engine was increased, such as would occur when the motorcycle sped up past twenty miles per hour, or when the motorcycle operator revved the engine.

Spring 45 could optionally also be used in conjunction with either of the bellows actuated embodiments depicted in FIG. 6. In addition, it is contemplated to fall within the scope of this disclosure that any vacuum-driven actuator be used to move pushrod 52. For example, a diaphragm could be used, or a diaphragm/spring combination, or a bellowsphram, etc.

Jaw 5 comprises jaw ramp 10, which is a substantially flat inside upper surface of jaw 5. Jaw ramp angle 15 is the angle between jaw ramp 10 and the lower surface of skull-shaped air filter housing 2. As may be noted in FIG. 6, when jaw 5 is in the open position, jaw ramp angle 15 is 30 degrees±15 degrees. It has been established experimentally that a jaw ramp angle 15 of 30 degrees±15 degrees is the optimum jaw ramp angle to most efficiently channel ram air through jaw intake 16 into housing cavity 7.

FIG. 6 also depicts another alternate embodiment of skull-shaped air filter housing 2 wherein light 51 is mounted within housing cavity 7. Light 51 may be one or more electric lights, or any other appropriate source of illumination. The presence of a light within housing cavity 7, which shines out from eye intakes 12, nose intake 14, and jaw intake 16 when jaw 5 is open, enhances the aesthetic appeal of the instant skull-shaped air filter housing 2, especially at night. It is contemplated to fall within the scope of this invention that any appropriate type or color light 51 may be used.

When a motorcycle upon which skull-shaped air filter housing 2 is mounted is in motion, ram air enters housing cavity 7 through eye intake(s) 12 and nose intake 14 as shown by arrow 36 and 38 respectively in FIGS. 5 and 6. This ram air passes through the air filter 18 and into the carburetor air intake through air filter 18, housing filter aperture 11, fitting intake 22, fitting lumen 21, and fitting outlet 20. When jaw 5 is open as depicted in FIG. 6, ram air additionally enters housing cavity 7 through jaw intake 16 as indicated by arrow 40 in FIG. 6.

While the skull depicted in FIGS. 1–8 is a human skull, it is contemplated to fall within the scope of this invention that any skull, head or face be used. Skulls which could be used include, but are not limited to, wolf skulls, dragon skulls, hog skulls, tiger skulls, lion skulls, dinosaur skulls, insect skulls, etc. Heads or faces of the above could be used, or other heads or faces.

Figure 8:
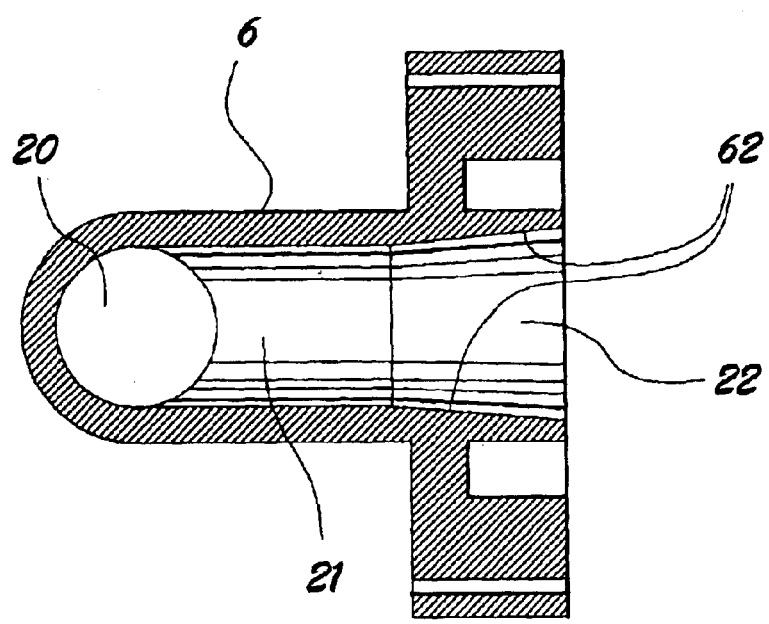
FIG. 8 is a right side cross-sectional view of a fitting.

FIG. 8 is a right side cross-sectional view of an alternate embodiment fitting 6 incorporating a diameter reduction 62 in fitting lumen 21 at fitting intake 22. This diameter reduction is known as A velocity stack, and serves to cool and compress air going to the carburetor.

In the preferred embodiment, housing 4, fitting 6 and jaw 5 were aluminum, steel, titanium, Synthetic, or any other appropriate metal or other material. Fasteners 42 were off-the-shelf Fasteners, Bellows 54, pushrod 52, cable 46, cable sheath 48, and spring 45 were commercially available items.

While a preferred embodiment of the invention has been illustrated herein, it is to be understood 21 that changes and variations may be made by those skilled in the art without departing from the spirit of the appending claims.

Drawing Item Index 2 skull-shaped air filter housing
4 housing
5 jaw
6 fitting
7 housing cavity
8 jaw hinge
9 face
10 jaw ramp
11 housing filter aperture
12 eye intake
14 nose intake
15 jaw ramp angle
16 jaw intake
18 air filter
19 air filter mouth
20 fitting outlet
21 fitting lumen
22 fitting intake
24 filter groove
26 filter nipple
28 hose clamp access notch
30 arrow
32 fitting intake fastener bore
34 fitting intake flange
35 hose clamp
36 arrow
38 arrow
40 arrow
42 fastener
44 hose clamp access notch cover
45 spring
46 cable
48 cable sheath
50 arrow
51 light
52 pushrod
54 bellows
56 vacuum source
58 exterior jaw bellcrank
60 interior jaw bellcrank
62 diameter reduction

I claim:

1. A skull-shaped air filter housing comprising a housing removably attached to a fitting, said fitting comprising a fitting lumen terminating at one end in a fitting intake and at an opposite end in a fitting outlet, said housing comprising a face at one end, a housing filter aperture, and a housing cavity sized to admit a filter, said face comprising at least one eye intake, a nose intake, and a jaw intake.

2. The skull-shaped air filter housing of claim 1 further comprising a jaw hingedly attached along a lower edge of said jaw intake, said jaw capable of rotating between a closed position and an open position, said jaw being sized and located to cover said jaw intake when said jaw is in said closed position.

3. The skull-shaped air filter housing of claim 2 further comprising means of biasing said jaw into said closed position.

4. The skull-shaped air filter housing of claim 3 wherein said means of biasing said jaw into said closed position comprises a spring attached at one end to said jaw, and at an opposite end to said housing, whereby at a predetermined speed of air impinging against said jaw, said jaw will be pushed into said open position by ram air.

5. The skull-shaped air filter housing of claim 2 further comprising a means of rotating said jaw.

6. The skull-shaped air filter housing of claim 5 wherein said means of rotating said jaw comprises a cable connected to said jaw.

7. The skull-shaped air filter housing of claim 6 wherein said cable is connected to an exterior jaw bellcrank attached to an exterior of said jaw.

8. The skull-shaped air filter housing of claim 6 wherein said cable is connected to an interior jaw bellcrank attached to an upper inside surface of said jaw.

9. The skull-shaped air filter housing of claim 5 wherein said means of rotating said jaw comprises a pneumatically actuated device communicating with a vacuum source, an output of said pneumatically actuated device connected to said jaw.

10. The skull-shaped air filter housing of claim 9 wherein said pneumatically actuated device is connected to an exterior jaw bellcrank attached to an exterior of said jaw.

11. The skull-shaped air filter housing of claim 9 wherein said pneumatically actuated device is connected to an interior jaw bellcrank attached to an inside upper surface of said jaw.

12. The skull-shaped air filter housing of claim 2 wherein said jaw comprises a jaw ramp disposed on its upper surface.

13. The skull-shaped air filter housing of claim 12 wherein a jaw ramp angle between said jaw ramp and a lower surface of said skull-shaped air filter housing is 30 degrees±15 degrees when said jaw is in an open position.

14. The skull-shaped air filter housing of claim 2 further comprising a light disposed within said housing cavity.

15. The skull-shaped air filter housing of claim 2 wherein said fitting lumen comprises a diameter reduction at said fitting intake.

16. The skull-shaped air filter housing of claim 2 wherein said fitting comprises a fitting intake flange at said fitting intake.

17. The skull-shaped air filter housing of claim 16 wherein said fitting intake flange comprises a filter nipple disposed within a filter groove, said filter nipple being sized to fit into a filter mouth, said filter groove being sized to accommodate a filter mouth.

18. The skull-shaped air filter housing of claim 17 wherein said fitting intake flange comprises a hose clamp access notch whereby a hose clamp securing a filter on said filter nipple may be accessed.

19. The skull-shaped air filter housing of claim 18 wherein said housing further comprises a hose clamp access notch cover sized and located to cover said hose clamp access notch when said housing is attached to said fitting.

20. The skull-shaped air filter housing of claim 9 wherein the pneumatically actuated device output is connected to said jaw by means of a pushrod.

21. A skull-shaped air filter housing comprising a housing removably attached to a fitting, and a jaw hingedly attached to said housing, said fitting comprising a fitting lumen terminating at one end in a fitting intake and at an opposite end in a fitting outlet, said housing comprising a face at one end, a housing filter aperture, and a housing cavity sized to admit a filter, said face comprising at least one eye intake, a nose intake, and a jaw intake, said jaw being sized and located to cover said jaw intake when said jaw is in a closed position.

22. The skull-shaped air filter housing of claim 21 further comprising means of controlling a rotational position of said jaw.

23. The skull-shaped air filter housing of claim 22 wherein said means of rotating said jaw-comprises a cable connected to said jaw.

24. The skull-shaped air filter housing of claim 22 wherein said means of rotating said jaw comprises a pneumatically actuated device communicating with a vacuum source, an output of said pneumatically actuated device connected to said jaw.

25. The skull-shaped air filter housing of claim 21 further comprising means of biasing said jaw into said closed position.

26. The skull-shaped air filter housing of claim 21 wherein said jaw comprises a jaw ramp disposed on its upper surface.

27. The skull-shaped air filter housing of claim of claim 26 wherein a jaw ramp angle between said jaw ramp and a lower surface of said skull-shaped air filter housing is 30 degrees±15 degrees when said jaw is in an open position.

28. The skull-shaped air filter housing of claim 27 wherein said fitting further comprises a fitting intake flange comprising a filter nipple disposed within a filter groove, said filter nipple being sized to fit into a filter mouth, said filter groove being sized to accommodate a filter mouth.

29. The skull-shaped air filter housing of claim 28 wherein said fitting intake flange comprises a hose clamp access notch whereby a hose clamp securing a filter on said filter nipple may be accessed, and wherein said housing further comprises a hose clamp access notch cover sized and located to cover said hose clamp access notch when said housing is attached to said fitting.

\* \* \* \* \*